US008830162B2

(12) United States Patent
Helmer

(10) Patent No.: US 8,830,162 B2
(45) Date of Patent: Sep. 9, 2014

(54) SYSTEM AND METHOD THAT GENERATES OUTPUTS

(75) Inventor: Richard James Neil Helmer, Geelong West (AU)

(73) Assignee: Commonwealth Scientific and Industrial Research Organisation, Campbell (AU)

(*) Notice: Subject to any disclaimer, the term of this patent is extended or adjusted under 35 U.S.C. 154(b) by 1224 days.

(21) Appl. No.: 12/306,643

(22) PCT Filed: Jun. 29, 2007

(86) PCT No.: PCT/AU2007/000906
§ 371 (c)(1),
(2), (4) Date: Jun. 11, 2009

(87) PCT Pub. No.: WO2008/000039
PCT Pub. Date: Jan. 3, 2008

(65) Prior Publication Data
US 2009/0256801 A1 Oct. 15, 2009

(30) Foreign Application Priority Data

Jun. 29, 2006 (AU) ................................ 2006903501

(51) Int. Cl.
*G09G 5/00* (2006.01)
*G01P 5/00* (2006.01)
*G10H 1/18* (2006.01)
*G06F 3/01* (2006.01)
*G10H 1/34* (2006.01)

(52) U.S. Cl.
CPC ......... *G10H 1/342* (2013.01); *G10H 2230/135* (2013.01); *G06F 3/011* (2013.01); *G06F 3/017* (2013.01); *G10H 1/348* (2013.01); *G10H 2220/321* (2013.01); *G10H 2220/005* (2013.01); *G10H 2230/141* (2013.01)
USPC .............................. 345/156; 702/142; 84/722

(58) Field of Classification Search
USPC ......................................................... 345/156
See application file for complete search history.

(56) References Cited

U.S. PATENT DOCUMENTS 5,875,257 A 2/1999 Marrin et al.
6,388,183 B1 5/2002 Leh
(Continued)

FOREIGN PATENT DOCUMENTS

JP 06083336 A 3/1994
JP 2006-251023 A 9/2006
WO 01/86627 A2 11/2001

OTHER PUBLICATIONS

Extended European Search Report issued Jun. 25, 2013 in corresponding European Patent Application No. P332750EP-PCT.

*Primary Examiner* — Charles V Hicks
(74) *Attorney, Agent, or Firm* — Sughrue Mion, PLLC

(57) ABSTRACT

The present invention relates to a system and method that generates outputs based on the operating position of a sensor which is determined by the biomechanical positions or gestures of individual operators. The system including a garment on which one or more than one sensor is removably attached and the sensors provide a signal based on the biomechanical position, movement, action or gestures of the person wearing the garment, a transmitter receiving signals from the sensors and sends signals to a computer that is calibrated to recognize the signals as representing particular positions that are assigned selected outputs. Suitably the outputs are audio outputs of an instrument, such as a guitar, and the outputs simulate the sound of a guitar that would be played when the biomechanical motion, action, gesture or position of the operator resembles those that would occur when an actual instrument is played.

46 Claims, 6 Drawing Sheets

(56) References Cited

U.S. PATENT DOCUMENTS

| | | |
|---|---|---|
| 7,565,295 B1* | 7/2009 | Hernandez-Rebollar ..... 704/271 |
| 2002/0070914 A1* | 6/2002 | Bruning et al. ............... 345/102 |
| 2002/0126014 A1 | 9/2002 | Nishitani et al. |
| 2003/0083596 A1* | 5/2003 | Kramer et al. ................ 600/595 |
| 2004/0074379 A1 | 4/2004 | Ludwig |
| 2004/0077934 A1* | 4/2004 | Massad ......................... 600/300 |
| 2005/0098021 A1 | 5/2005 | Hofmeister et al. |
| 2005/0143173 A1 | 6/2005 | Barney et al. |
| 2006/0265187 A1* | 11/2006 | Vock et al. .................... 702/182 |
| 2007/0035528 A1* | 2/2007 | Hodge ........................... 345/174 |
| 2007/0256551 A1* | 11/2007 | Knapp et al. .................... 84/722 |
| 2008/0136775 A1* | 6/2008 | Conant ........................... 345/156 |
| 2008/0191864 A1* | 8/2008 | Wolfson ......................... 340/524 |

\* cited by examiner

SYSTEM AND METHOD THAT GENERATES OUTPUTS

CROSS REFERENCE TO RELATED APPLICATIONS

This application is a National Stage of International Application No. PCT/AU2007/000906 filed Jun. 29, 2007, claiming priority based on Australian Application No. 2006903501 filed Jun. 29, 2006, the contents of all of which are incorporated herein by reference in their entirety.

FIELD AND BACKGROUND OF THE INVENTION

The present invention relates to a system and method that generates outputs based on the position of a sensor. The position of the sensor can be related to many variables but is preferably based on the movement or gestures of a person.

According to one embodiment of the present invention the outputs are preferably in the form of sounds which can be played based on the gestures of a person to produce music.

An example of an electronic musical instrument that plays sound based on movement and gestures of a person is the "Virtual Air Guitar" system that is currently featuring at the Heureka Science Centre in Finland. The Virtual Air Guitar system utilizes visual recognition technology whereby the hand movements and gestures of a user wearing particular gloves are observed by a webcam and analysed by gesture recognition software. The software monitors the relative spatial position between the user's hands and assumes that the right hand is located on the body of a virtual guitar and that the left hand is located in the fret of the virtual guitar. Movement of the right hand in an upward and downward direction is interpreted as simulating strumming of the guitar while movement of the left hand toward and away from the right hand is interpreted as simulating movement of the left hand along the fret arm of a guitar.

The system enables the user to make gestures or actions as if they were playing an actual guitar to produce sound within the mathematical constraints of the model. However, the optical model has inherent complications arising from a single camera source, e.g. it would be very difficult to play the Virtual Air Guitar behind one's head or if any other object blocks the operator's hands from the field of view of the webcam.

Furthermore, in our view it would be difficult to usefully employ the sound produced by the system in a musical performance that is able to be reliably reproduced or played to accompany other musical instruments.

SUMMARY OF INVENTION

System of the Invention

According to the present invention there is provided a system including:
one or more than one sensor and that each sensor is operated over two or more than two operating positions; and
an electronic device that produces outputs, wherein the electronic device receives signals from the or each sensor based on the operating positions thereof and the electronic device is calibrated so that selected operating positions of the or each sensor and thus the signals received by the electronic device are associated with particular outputs such that, once calibrated, a sequence of outputs can be produced by operating the or each sensor between operating positions.

Throughout this specification, the notion of the electronic device that produces an output embraces electronic devices that transmits an output, plays an output or creates an output that is stored.

It is preferred that the system be in the form of a musical system where the outputs are audible outputs. For example, the audible output may be any sound, a single note or a group of notes played together as a chord, riff, bar of music or other section of music. In any event, it is preferred that the audible output be a pre-recorded or stored sample of sound. The output may also re-produce the sound of any musical instrument including stringed instruments, percussion instruments, brass, woodwind, vocal or any synthesised sound.

The audible output may also be any noise or sound created by a single instrument or group of instruments playing together.

Although the electronic device of the present invention may have pre-recorded or stored audible outputs, it is preferred that the electronic device have the capacity to receive additional outputs as desired. For example, the additional outputs may be downloaded from the internet, or supplied on optical computer readable media including disks, CDs, DVDs and alike.

It is also preferred that the electronic device may produce or play accompanying outputs simultaneously with the outputs based on the operating position of the sensor. For example, the electronic device may automatically play a pre-recorded musical track that lacks the sound of one or more than one musical instrument that can be provided using the system of the present invention. In other words, the system can be used to provide a complete musical sound with the operator providing their own interpretation to one part of the overall music heard.

It is preferred that the operating positions of the sensor be a function of the relative angular positions of one or more body joint of an operator such as finger, wrist, elbow, shoulder, neck, back, hip, knee or ankle joints. It will be appreciated that the angular positions of the above mentioned body joints is dependant on a number of factors including flexibility, shape, size, weight and height of individual people. An advantage of the system of the present invention is that once an individual has calibrated the system to their particular biomechanical movements, the individual through repeating their own biomechanical movements can quickly learn to produce sounds and indeed, produce music that can be repeated or even played with other musical instruments including multiple devices of the instrument disclosed here.

It is preferred that the system includes a garment or clothing that is worn by a person and that the sensor is fitted to, or incorporated in the garment.

Although it is possible that the sensor may be any dial, switch, key or control knob, it is preferred that the sensor includes an electrical resistor that provides variable electrical resistance depending on the various operating positions of the sensor.

It is preferred that the resistor provides variable electrical resistance that is at least in part responsible for the signals received by the electronic device.

In the situation where the system includes a garment and the sensor fitted thereto is in the form a variable resistor, it is preferred that the variable resistor be in the form of the arrangement described in our earlier Australian provisional application 2005905666 dated 13 Oct. 2005 and entitled a SYSTEM FOR DETECTING MOVEMENT which is the priority document of International application PCT/AU2006/

001521 (WO07/041,806). The patent specifications of the provisional application and International application are hereby incorporated into this specification by direct reference.

It is preferred that the electronic device is calibrated such that a range of values of the signals from the sensor are associated with a particular output. In other words, the electronic device preferably associates a range of values of signals from the sensor with one or more operating positions. In the situation where the signals from the sensor and thus the operating positions are a function of the relative angular orientation of the body joints, it is preferred that the range of values of the signal selected for the operating positions are based or derived from the angular range over which the body joints are orientated.

It is preferred that the range of values of the signals from the sensor that are associated with selected operating position be adjustable. In other words, the range of signals associated with each operating position can be recalibrated on each occasion when a different person uses the system.

It is preferred that the electronic device store the configuration in which the system is calibrated or operated for each individual. In other words, once the operator has calibrated the system to their particular biomechanical movements and desired outputs, the personalized calibration can be recalled after use of the system by subsequent operators. Moreover, it is possible for the electronic device to receive the signals of sensors operated by two or more operators and for the electronic device to produce outputs based on the signals from the sensors from each operator. The outputs based on the signals and, preferably the biomechanical movement of multiple operators may be produce or played consecutively, concurrently or simultaneously.

It is preferred that the system include two or more sensors, each having two or more than two operating positions.

When the system includes two or more sensors each having multiple operating positions, it is preferred that two of the sensors be paired such that at least one of the operating positions of one of the sensors be associated with a number of outputs that equals or is less than the number of operating positions of the other sensor. In the situation when the first sensor has two or more operating positions and the second sensor has two or more operating positions, at least one operating position of the first sensor is associated with two or more outputs and at least one of the operating positions of the second sensor is associated with an output that identifies or matches with one of the two outputs associated with each operating position of the first sensor such that during use, the electronic device will produce or play one of the particular outputs associated with the operating positions of the first sensor that is either: i) identified by the operating position of the second sensor or ii) matches the output associated with the operating position of the second sensor. In other words, the total number of possible outputs is the number of calibrated operating position multiplied together. For example, two sensors each calibrated with two operating positions will enable the system to a total of four outputs. Similarly, when the system contains two sensors, one calibrated with three operating positions and another calibrated with two, a total of six outputs is possible.

Preferably, the number of the outputs associated with each operating position of one of the sensors equals the number of operating position of the other sensor.

It is even more preferred that the system includes two sensors for monitoring the angular position of the elbows of the operator.

The angular orientation of the elbow, and indeed, other bodily joints may range from approximately 45 to 180 degrees but is ultimately depending on the bodily joint involved and the flexibility of the individual. In the situation where the sensor monitors the angular orientation of an elbow, it is preferred that a range of values of the signal and thus the operating positions have an angular orientation ranging over 5 to 45 degrees. The range of angular orientation being a range any where between the elbow of the operator being completely curled and completely extended.

It is even more preferred that each operating position be defined over an angle ranging from 5 to 20 degrees.

It is preferred that the system includes a feedback means that communicates to the operator which operating position the sensor(s) is/are located.

It is preferred that the feedback means includes a means for visually communicating with the operator. Although the visual means may be of any form including a sequence of lights, dialogue or pictures, it is preferred that the system includes a monitor for displaying information on the operating positions to the operator and which operating position the sensor is located relative to other operating positions. The feedback means may provide this information both during calibration of the system and/or during general use of the system.

It is preferred that the visual means includes a picture or schematic illustration of a musical instrument or a part thereof corresponding to the output sounds and each operating position of the sensor simulates the operating position of part of the operator playing the instrument. For example, when the outputs are sample sounds of the guitar, it is preferred that the feedback means provides visual information that simulates the position of a operator's hand on the fret board for the guitar. In another example, the outputs of the system may be sounds of the piano and in this situation, it is preferred that the feedback means provides visual information that simulates the keys of the key board.

It is also preferred that the feedback means also communicates to the operator information identifying which particular output has been associated with the selected operating positions. Although this may be achieved audibly by the system producing or playing the various outputs associated with each operating position, it is also possible that the visual means may display information of the output associated with each operating position. For example, it is preferred that the visual means also identify that the riff, chord, key, notes, or sounds that are associated with each operating position.

It is preferred that a period of delay between the sensor being located in an operating position and the electronic device producing or playing a particular output associated with the operating position be minimised. This is to ensure that an operator of the system is at least provided with the perception that the output of the electronic device is substantially spontaneous or occurs shortly after the sensor is located into an operating position.

It is preferred that the delay period be equal to or less than 50 milliseconds, preferably equal to or less than 20 milliseconds.

It is preferred that the delay period be less than or equal to 10 milliseconds.

It is preferred that the electronic device has a memory for storing data on any one or a combination of:
    the operating positions, preferably ranges of values of the signals of the sensor for the operating positions during calibration of the system;
    the outputs, preferably audible outputs; and the allocation of particular outputs to selected operating positions.

It is preferred that the electronic device has a data process unit for process data on any one or a combination of the following:
- carrying out algorithms analysing the signal from the sensor;
- carrying out algorithms that assessing whether the signals equals or falls within the ranges of the values of the signals that identify particular operation positions; and
- carrying out algorithms that calculate the speed at which the value of a signal of a sensor changes, and preferably determines the volume at which an audible output should be played based on the rate of change of the signal.

According to the present invention there is provided a system including:
- a sensor that a person operates over two or more than two operating positions; and
- an electronic device that produces outputs, wherein the electronic device receives signals from the sensor based on the operating positions of the sensor and the electronic device is calibrated so that selected operating positions of the sensor and thus the signals received by the electronic device are associated with particular outputs such that, once calibrated, a desired sequence of outputs can be produced by locating the sensor in the respective operating positions.

According to an embodiment of the present invention there is provided a system that generates outputs based on the operating position of a sensor which is determined by the biomechanical positions or gestures of individual operators. The system including a garment on which one or more than one sensor is removably attached and the sensors provide a signal based on the biomechanical position, action, motion, movement or gestures of the person wearing the garment, a transmitter receiving signals from the sensors and sends signals to a computer that is calibrated to recognise the signals as representing particular positions that are assigned selected outputs. Suitably the outputs are audio outputs of an instrument, such as a guitar, and the outputs simulate the sound of a guitar that would be played when the biomechanical position, action, motion, movement or gesture of the operator resembles those that would occur when an actual instrument is played.

According to the present invention there is also provided a garment that is worn by a person that is operating a system that produces or plays outputs, the garment including:
- one or more than one sensor that is removably attached to the garment and at least one of the sensors is operable over two or more than two operating position; and
- a transmitter that is removably attached to the garment and receives signals from the sensors and wirelessly transmits signals to an electronic device, wherein the sensors are adapted to transmit signals base on biomechanical movement and positions of the person wearing the garment.

According to the present invention there is provided an electronic musical instrument including:
- a sensor that a person operates over two or more than two operating positions;
- an electronic device that produces and/or plays audible outputs, wherein the electronic device receives signals from the sensor identifying the operating positions of the sensor and the electronic device is operated/calibrated so that selected operating positions of the sensor and thus the signals received by the electronic device are associated with particular outputs such that, once calibrated, a desired sequence of the audible outputs can be produced and/or played by locating the sensor in the respective operating positions.

Although the system of the present invention may be utilised to produce or play sample sounds of any musical instrument, two embodiments of the present invention, each relating to particular musical instruments will now be described in detail.

Guitar Embodiment

According to one embodiment of the invention, the system can be configured to simulate an acoustic or electrically amplified guitar. In particular, according to this embodiment, it is preferred that one of the sensors monitors the angular orientation of an elbow such that the signals therefrom are, for example, calibrated into at least six ranges, each representing operating positions. Preferably, the six operating positions are each associated with a pairs of outputs, each pair representing a chord that produces the sound of a chord played by an upstrum or a downstrum. Monitoring the angular orientation and, thus, the operating position of the sensor in this manner enables movement of the elbow to be used to simulate a hand being slid back and forth along a fret board of a guitar as if selecting for play six different chords. For convenience, this sensor is hereinafter referred to as the fret board sensor.

According to this embodiment, it is also preferred that another sensor, hereinafter referred to as the strumming sensor, monitors the angular orientation of the other elbow such that the signals from the strumming sensor are calibrated into at least two different operating positions. In particular, the electronic device is calibrated such that two ranges of values of the signal from the strumming sensor are each selected as operating positions. Preferably, one of the operating positions represents when the elbow is oriented in a curled position and the other when the elbow is oriented in an extended position and the two operating positions are separated by a further range of angular orientations that is not assigned an output. Moreover, the electronic device receives a signal indication that the elbow has moved from the curled position to an extended position, the electronic device can produce or play an output that corresponds to a down strumming of the strings of the guitar for a particular chord determined by the signal from the fret sensor. Similarly, when the electronic device receives a signal indicating that the strumming sensor has moved from an extended position to the curled position, the electronic device can produce or play a sound that corresponds to an upward strumming of the guitar of a particular chord or note determined by the signal of the fret broad sensor.

According to this embodiment, the operating positions of the fret board sensor are associated with a chord or note in the form of either the chord heard as a down strum or an up strum and the system outputs the sound of either version of the chord based on whether the signal from the strumming sensor identifies an up strum or down strum. In addition, changes in the signal from the strumming sensor, ie a change in angular orientation of the strumming arm is used as the trigger for either playing or not playing the particular sound and the rate of change of the signal determines the volume at sound played. Preferably, volume increases with increasing rates of change of the signal.

It is also possible that the signal of the strumming sensor may also be calibrated into 3, 4, 5 or more operating positions. In this situation, each operating position is associated with an output that reflects a single string of a guitar being plucked or a different aspect of producing sound from a guitar.

Tambourine Embodiment

According to another embodiment of the present invention the system is configured to simulate a tambourine. In particular, according to this embodiment it is preferred that a sensor monitors the angular orientation of an elbow such that the signals from the elbow sensor are calibrated into at least two different positions. One position represents when the elbow is oriented in a curled position and the other when the elbow is oriented in an extended position. Moreover, when the electronic device receives a signal indication that the elbow has moved from the curled position to an extended position, the electronic device can produce or play and output that corresponds to a sound that replicates or simulates cymbals of the tambourine crashing. In addition, when the electronic device receives a signal indicating that the elbow has moved from an extended position to the curled position, the electronic device can produce or play a sound that replicates or simulates sound of a tambourine that hits an objection such as a hand or leg.

Method of the Invention

According to the present invention there is provided a method of operating a system including one or more sensors having a plurality of operating positions and an electronic device for producing or playing outputs, wherein the electronic device receives signals from the or each sensor that is based on the operating positions of the sensor(s), and wherein the method including the steps of:
 a) adjusting the sensor(s) between different operating positions; and
 b) assigning at least one output to the operating positions of the or each sensor such that when adjusting the sensor(s) between different operating positions in accordance with step a), the electronic device produces or plays an output.

It is preferred that the method be a method of operating a musical system and that the outputs be audible outputs. Preferably, the audible outputs are a sample of notes, chords, riffs, bar or a section of actual music.

It is preferred that step a) includes manipulating the sensor between operating positions so as produce a sequence of outputs.

It is preferred that step a) involves moving the sensor between known operating positions having known outputs assigned thereto so as produce a known sequence of outputs. The method of the present invention therefore enables novice and experienced musicians alike to learn to play music including music written on a score or even a simplified method of performance annotation.

In the situation when only one sensor is present, assigning particular outputs to the operating positions of the sensor is performed on single output per operating position basis.

In the situation when two or more sensors having multiple operating positions are present, it is preferred that the two sensors are paired such that step b) involves assigning to at least one of the operating positions of the one of the sensors a number of outputs that equals or is less than the number of operating positions of the other sensor. For example, in the situation when the first sensor has two or more operating positions and the second sensor has two or more operating positions, preferably, step b) involves assigning to at least one operating position of the first sensor two or more outputs and the operating positions of the second sensor identifies one of the outputs associated with each operating position of the first sensor such that, when step a) is carried out, the electronic device will produce or play the particular output of the operating position of the first sensor that is identified by the operating position of the second sensor.

It is preferred that the step b) involves assigning a number of the outputs to each operating position of one of the sensors the number of operating positions of the other sensor.

It is preferred that the method includes the step of: c) defining particular operating positions based on the signal from the sensor received by the electronic device. Preferably, step c) involves defining particular operating positions as a range of values of the signals of the sensor received by the electronic device. These can be initially provided by a supplier and later customised by an individual user.

Although the operating positions of the sensor may be defined in any frame of reference using keys, control knobs, switches and alike, in order for the invention to be used in situations where gestures are made as if playing a musical instrument, it is preferred that step c) involves the operating positions be defined by the angular orientation of one or more body parts. Preferably, the operating positions of the sensor be a function of the relative angular positions of one or more body joints such as finger, wrist, elbow, shoulder, neck, back, hips, knees or ankles.

In situations where the operating positions are defined by a range of values of signals and are a function of angular orientation, it is preferred that the signals from the sensor vary with the angular orientations of the bodily joint.

In the situation where the operating positions are a function of angular positions of the a body joint, it is preferred that step b) involves assigning particular outputs to the operating position based on the operating position resembling the angular position or gesture that would be required when operating an actual instrument. For example, when the invention is used to produce the sound of a guitar, the operating positions and thus the angular orientations of the operator's arms and suitably their elbows, are co-ordinate with sound of the output. By coordinating the operating positions and the outputs in this manner, playing music is intuitive, particular to operators who have prior experience in playing the actual instrument being simulated and represents a method of learning for those of limited experience.

It is preferred that any one or a combination of steps a), b) and c) are carried out while the electronic device communicates to the operator information relating to either one or both of:
 the operating positions in which the sensor is located; and/or
 the output assigned to the particular operating positions.

Preferably the information is communicated to the operator by visual and/or audio sources.

It is preferred that the visual source visually communicates all of the possible operating positions and that the operating position in which the sensor is located at a particular time is indicated. Preferably, the information communicated to the operator includes a picture or schematic illustration of an instrument or a part thereof and each operating position of the sensor simulates the operating position of part of the operator playing the instrument.

It is preferred that the visual source communicate information identifying the particular output assigned to the operating positions.

It is preferred that the audio source audibly communicate to the operator information identifying which particular output assigned to the operating positions.

It is preferred that that the method includes the step of: d) storing data on the signals or the values of ranges from the sensor that have been selected as defining the operating positions.

It is preferred that step d) also involve storing data on the outputs assigned to the operating positions. Preferably the data stored by step d) is stored with reference to the individual operator and, therefore, the electronic device can be readily switched between stored calibrations/configurations when used by one than one operator.

It is preferred that the method includes analysing the signal from the sensor using an algorithm such that the visual source communicates to the operator the operating position in which the sensor is located relative to the other operating positions.

It is preferred that the method includes analysing the signal from the sensor using an algorithm that calculates whether the signals equal or falls within the ranges of the values of the signals that have been selected as defining the operating positions in accordance with step c).

It is preferred that the method includes analysing the signal from the sensor using an algorithm that calculates the speed at which the value of a signal of a sensor changes, which in turn, preferably determines the volume at which an audible output should be played.

It is preferred that the method includes loading samples of output onto the electronic device. The samples many be obtained from any source including the internet and/or from optical computer readable mediums suitably CD's and DVD and alike.

It is preferred that the method includes playing a partially complete music at the same time as carrying out step a) such that the outputs played by step a) accompanies the music being played.

According to the present invention there is also provided a method of operating a system including one or more sensors having a plurality of operating positions and an electronic device for producing or playing outputs based on biomechanical positions or movement of an individual operator, the method including the steps of:
  a) transmitting a signal from the sensors to the electronic device, wherein the sensors are adapted to transmit signals based on biomechanical movement and positions of the operator; and
  b) assigning at least one output to the operating positions of the or each sensor such that when adjusting the sensors between different operating positions, the electronic device produces or plays the desired output.

It will be appreciated that the method of the present invention may also include any one or a number of the preferred features described under the heading "System of the invention", such as:
  period of delay for the output to be produced or played once the sensor has been located in selected operating position;
  the signal from the sensor being at least in part formed by variable resistor and, by of example, has the structure of the arrangement shown in our earlier provisional application 2005905666; and
  the outputs being in the form of guitar sounds and two sensors, each providing signals based on the angular orientation of the elbows of the operator, and thereafter carrying out steps a) and b), and optionally steps c) and d) so as to output an actual guitar being played.

BRIEF DESCRIPTION OF THE DRAWINGS

The present invention will now be described with reference to the accompanying drawings; of which.

DETAILED DESCRIPTION

A preferred embodiment of the present invention will now be described with reference to a system and method that a musician can utilize to produce the sound of a guitar. In particular, as will be explained in greater detail below, operation of the preferred embodiment is based on the angular orientation of the elbows of the musician that are monitored using an especially adapted garment. However, it will be appreciated that the present invention can be used to produce the sound of essentially any musical instrument or any other audible output. It is even possible that the present invention may also be used to control visual outputs such as pyrotechnics or light displays. It is also within the scope of the present invention that any bodily joint, switch, keys or control knob may be used as the bases on which to control the operation of the invention.

Figure 1:
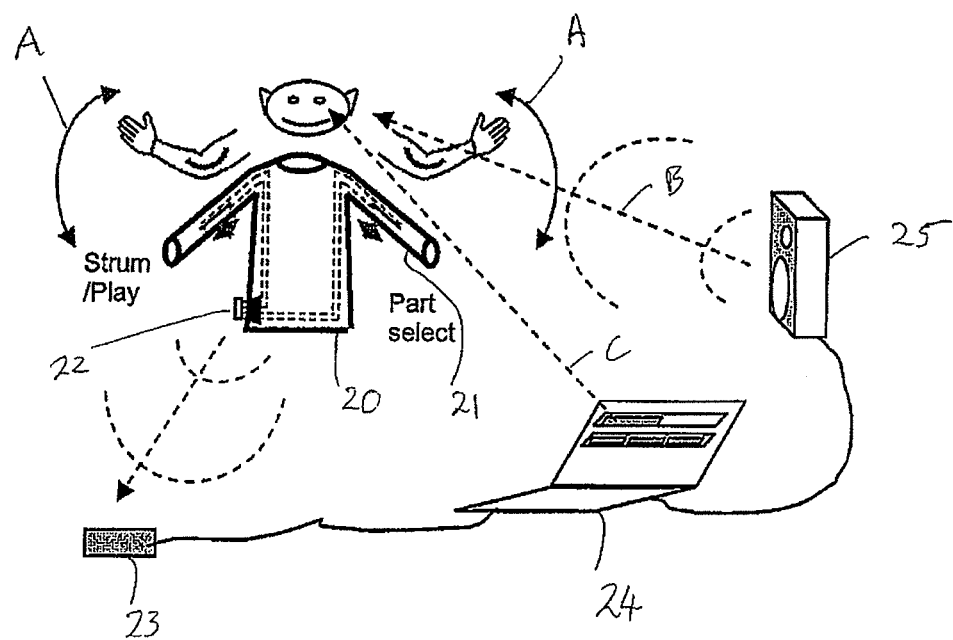
FIG. 1 is a schematic illustration of the components of a system according to a preferred embodiment of the present invention whereby the sound of a guitar is played by a computer based on the angular orientation of the elbows of a musician.

With reference to FIG. 1, the preferred embodiment of the invention comprises a garment in the form of a shirt 20, suitably a long sleeved short made from a textile having elastic properties and is equipped with sensors 21 located in the elbow regions. The shirt 20 also includes a transmitter 22 that wirelessly transmits signals to a receiver 23 that is coupled to a computer 24 via a USB port or similar connection. The computer 24 may be any suitable PC or McIntosh machine that has a monitor and a processing unit. The computer 24 is connected to speakers 25 and amplifier if needed.

The sensors 24 located at the elbow region of the shirt 20 are preferably in the form of a variable resistor comprising a stiffened filament that is fixed to the shirt 20 and held in particular shapes while connected to contact points that apply a potential difference to the filament. The filament is configured between the contact points in shapes such as I, J or hook shapes, C or curved shapes and X cross shapes that change as the textile of the garment is deformed through being stretched and/or compressed. In particular, when a person wearing the shirt 20 bends their elbow the length of the filament between the contact points changes and, therefore, changes the electrical resistance. Further detail on the structure of a suitable sensor 21 is provided in the patent specification of our earlier Australian provisional application 2005905666 which is now proceeding as International application PCT/AU2006/001521 (WO07/041,806). The patent specifications of the provisional application and International application are hereby incorporated into this specification.

When the shirt 20 is worn by a musician, changes in angular orientation of the elbows, as indicated by the direction of arrows A, and thus changes in the signals from the sensor 21, preferably measured as either electrical current or voltage are conveyed from the transmitter 22 to the receiver 23 and then directly to the computer 24. The signals from the sensors 21 are converted from an analogue signal to a digital signal either by the transmitter 22 or receiver 23 as desired. The operational status of the system is continuously communicated to the musician by way of sound from the speakers 25 and by information presented on the monitor of the computer 24.

Figure 2:
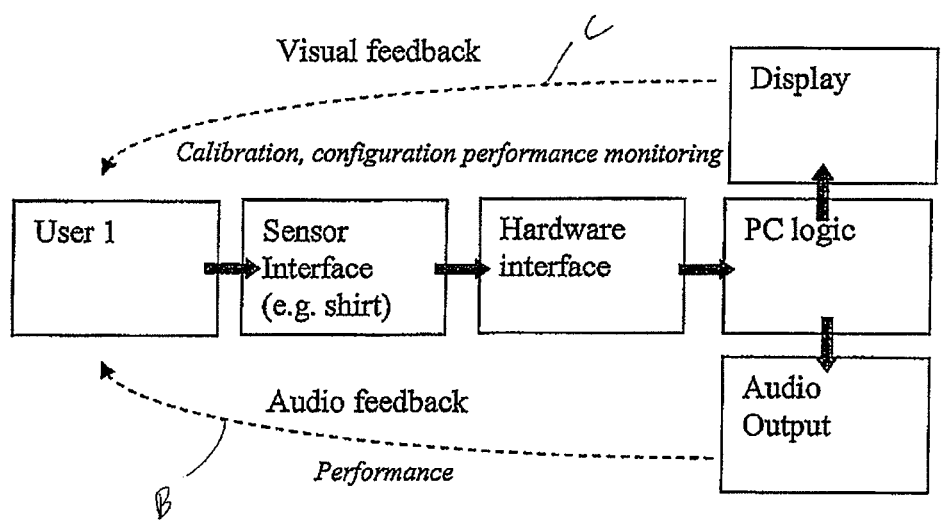
FIG. 2 is a flow diagram illustrating the communication channels in the system illustrated in the FIG. 1.

Communication between the components of the system is shown by the arrows in the flow diagram in FIG. 2. Initially, signals from the sensor 21 are conveyed via the transmitter 22 and receiver 22 to the computer 24 which is shown in the flow diagram as the hardware interface. The processing unit of the computer 24 using suitable algorithms embedded in coding or suitable software, identified in the flow diagram as the PC logic, analyses the signals received and based on the analysis, the computer plays audio outputs via the speaker 25. The audio output can be any sound sample that has been pre-stored but suitably, is in the form of sound that correlate at least in part of the gestures or actions of the operator wearing the garment. The sounded produce providing both the desired audio stimulus and feedback on the operating status of the system.

In addition, the operating status and the analysis of the signal performed by the computer are also fed back to the musician via the computer monitor. Both the audio and visual feedback to the musician is depicted in FIGS. 1 and 2 by dashed arrows B and C respectively.

The shirt 20 or garment may be any garment including loose or tight fitting garments to which the sensors 21 are fitted to, or incorporated in, the fabric of the garment. Ideally, the sensors 21 and transmitter 22 are removably attached to the garment by suitable couplings or interconnecting means including hook and loop fasteners, press studs or co-operating clasps. In the case of the embodiment shown on FIG. 1, the sensors 21 are removably attached to the elbows of the garment and signals from the sensors 21 at each elbow are conducted to a single transmitter 22 that is removably located to another part of the garment, suitably remotely located from the sensors 21 so as not to interfere with biomechanical movement of the operator. The sensors 21 and transmitters 22 may be directly or indirectly attached to the garment and in the situation where they are indirectly attached preferably the sensors 21 and transmitter 22 are mounted to a separate textile substrate which, when in use, is attached to the garment. The textile substrate and garment may be made of any suitable fabric including elasticized or non-elasticized fabrics.

Guitar Configuration

Figure 3:
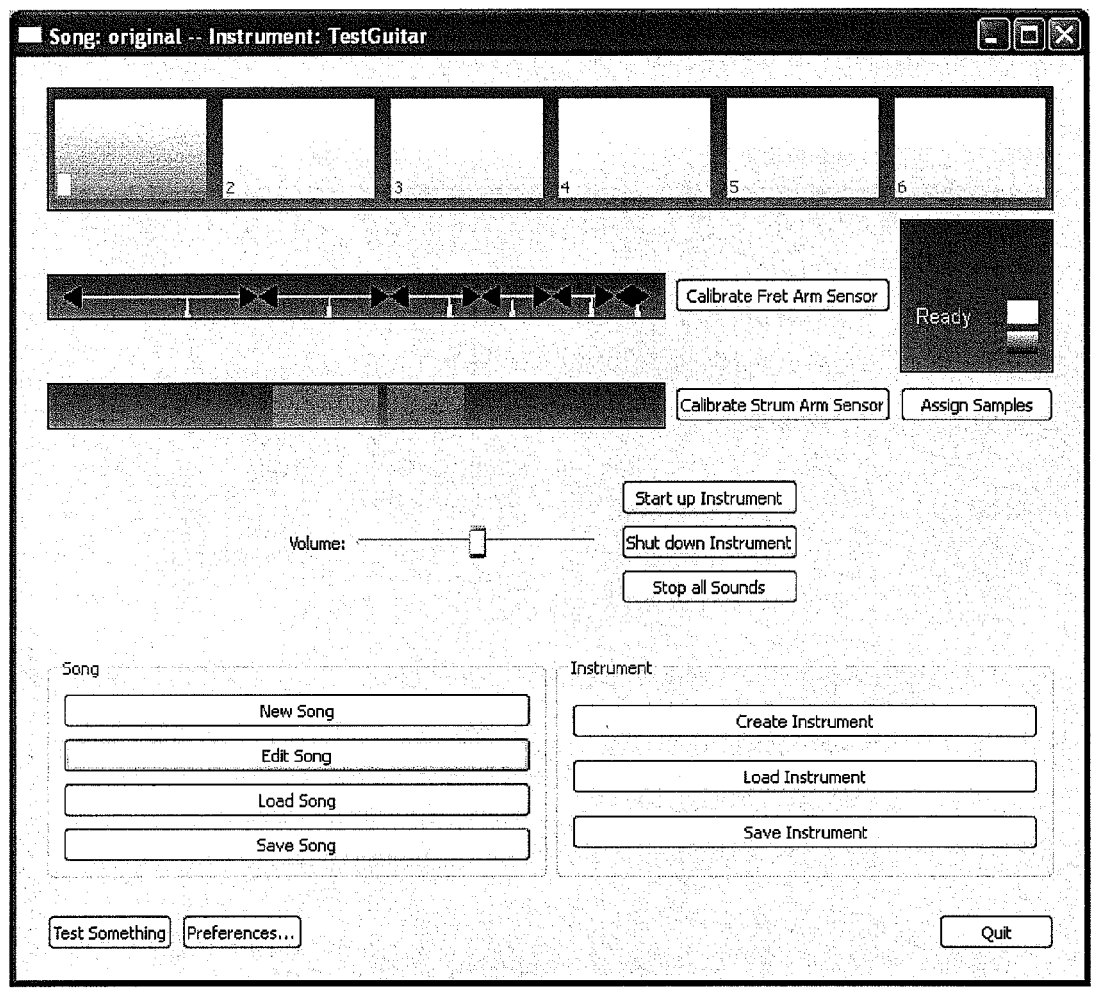
FIG. 3 is a screen shot of a monitor of the computer shown in FIG. 1 that provides visual feedback to the musician.

FIG. 3 is a screen shot of the computer monitor we have developed as a template to aid in the production of guitar sounds.

The top section of the screen comprises 6 fret boxes, numbered 1 to 6, which represent 6 operating positions on the fret arm of the guitar and, therefore, 6 different chord positions. Fret box 1 represents a chord position closest to the guitar body and fret box 2 represents the next chord away from guitar board and so forth until fret box 6 represents the chord position furthest from the guitar body. Although FIG. 3 shows that the fret arm is separated into 6 different positions, the template is entirely configurable in the sense that the number of the fret boxes could be increased up to 12 or more positions if desired.

Located immediately below the 6 fret boxes is a fret line which is broken into six sections by triangular or arrow symbols. The fret line represents the length of the fret arm of a guitar and the length of each section between the arrows represents an operating position which in practice represents a range of angular orientations of the musician's elbows and which correspond with fret boxes 1 to 6. The lines running downwardly from the fret line provide a pictorial representation of the optimal orientation within each section or operating position.

Figure 4:
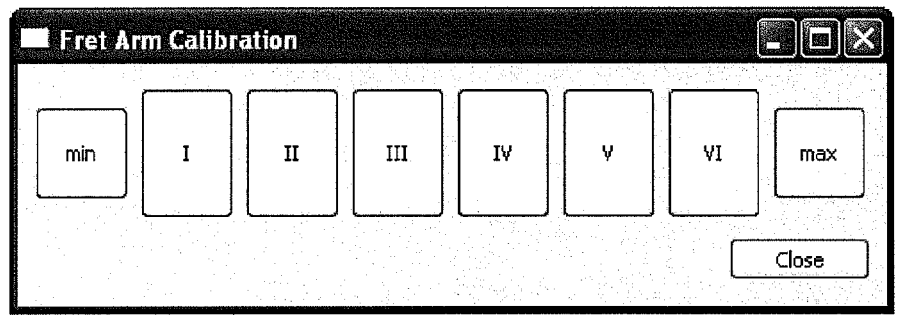
FIG. 4 is a screen shot of a window provided by pressing the "Calibrate Fret Arm Sensor" button shown in FIG. 3.

By pressing the "Calibrate Fret Arm Sensor" button located at the right hand end of the fret lines, the window shown in FIG. 4 will appear. This enables the boundaries of the operating positions and thus the range of angular orientations of the musician's elbow defining each chord or operating position to be adjusted or calibrated individually. The calibration process can be implemented a number of ways, however, the most efficient process we have devised is to first calibrate the system to the fully curled and fully extended positions for the fret sensor which is achieved by activating the MIN and MAX buttons shown in FIG. 4, and thereafter segregating or dividing the full range into the required number of operating positions. The operating positions may be evenly or unevenly distributed between the fully curled and fully extended positions. If desired, the arrows defining the boundaries of each operating position or section of the fret line can be calibrated on an individual based using the buttons I and VI based on the operators range of motion between the fully curled an fully extended positions.

Figure 5:
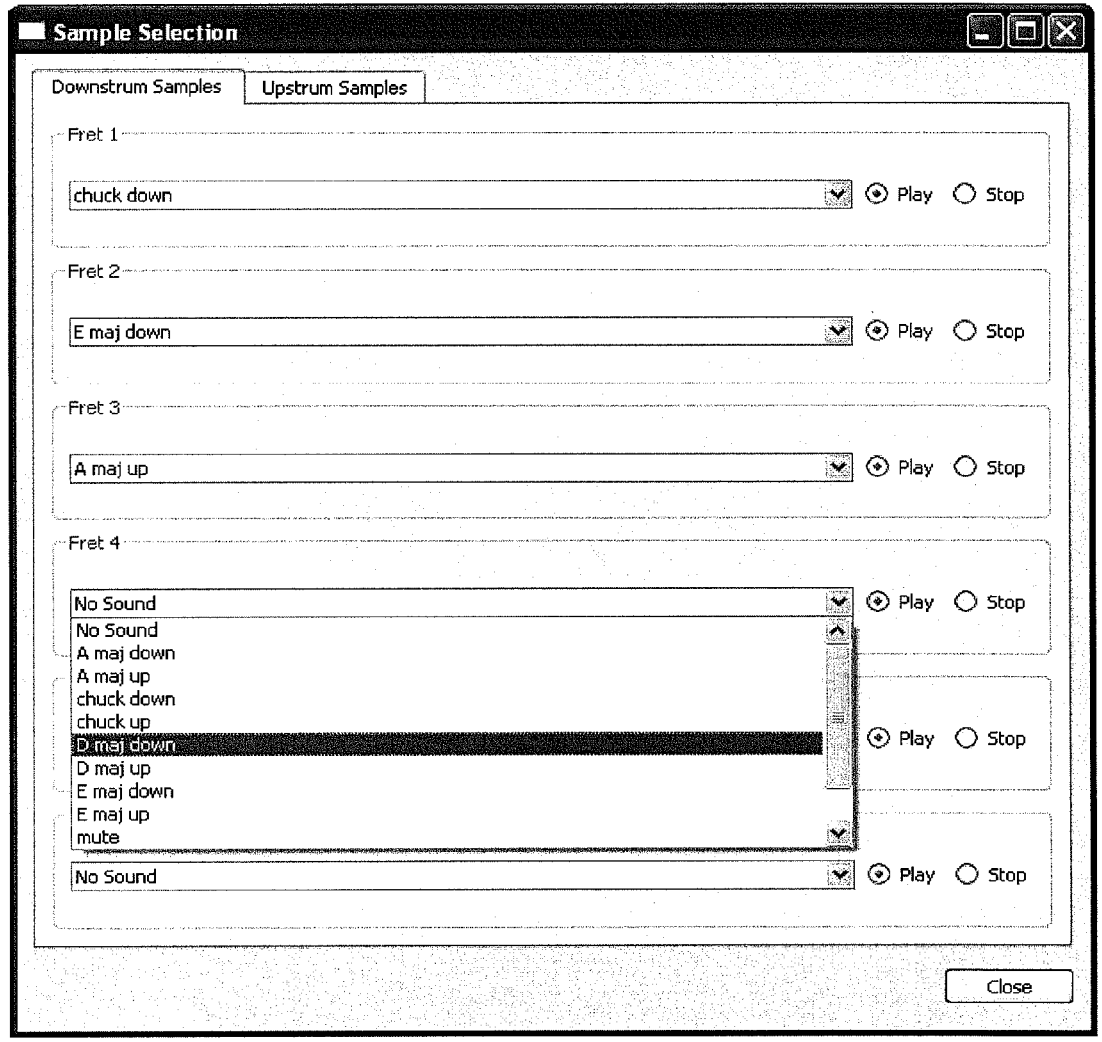
FIG. 5 is a screen shot of a window provided by pressing the "Assign Samples" button shown in FIG. 3.

By pressing the "Assign Samples" button in FIG. 3, the window provided in the FIG. 5 will appear. By activating the drop boxes for each fret box which are labelled Fret 1, Fret 2 . . . Fret 6, a range of pre-stored sample sounds can be allocated to the particular fret box. FIG. 5 shows that the sample sounds allocated to fret boxes 1, 2, 3 and 4 are:

Chuck down which is a percussion sound;
E major;
A Major; and
D Major.

Figure 6:
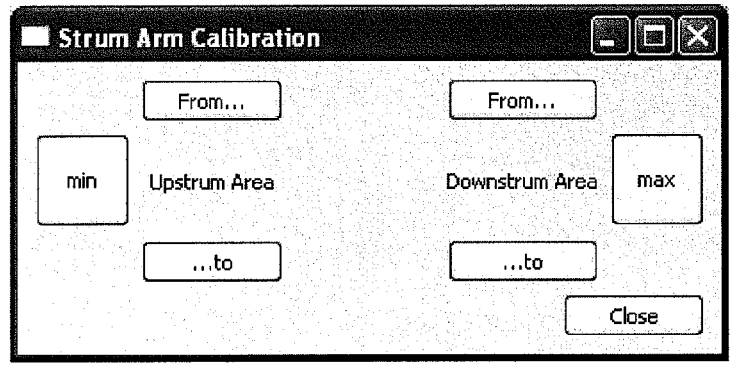
FIG. 6 is a screen shot of a window provided by pressing the "Calibrate Strum Arm Sensor" button shown in FIG. 3.

Referring back to FIG. 3, located below the fret lines are a strumming arm box that represents the status of the strumming arm of the guitar. By pressing the "Calibrate Strum Arm Sensor" the window shown in FIG. 6 will appear. The window shown in FIG. 6 has buttons "from . . . " and " . . . to" associated with both up strumming and down strumming actions. We have found that in order to simulate the sound produced by the strumming action, the strumming arm sensor is best calibrated into two ranges of elbow angular orientation that are separated by a range that is not allocated or interpreted as an action or assigned an output.

Figure 7:
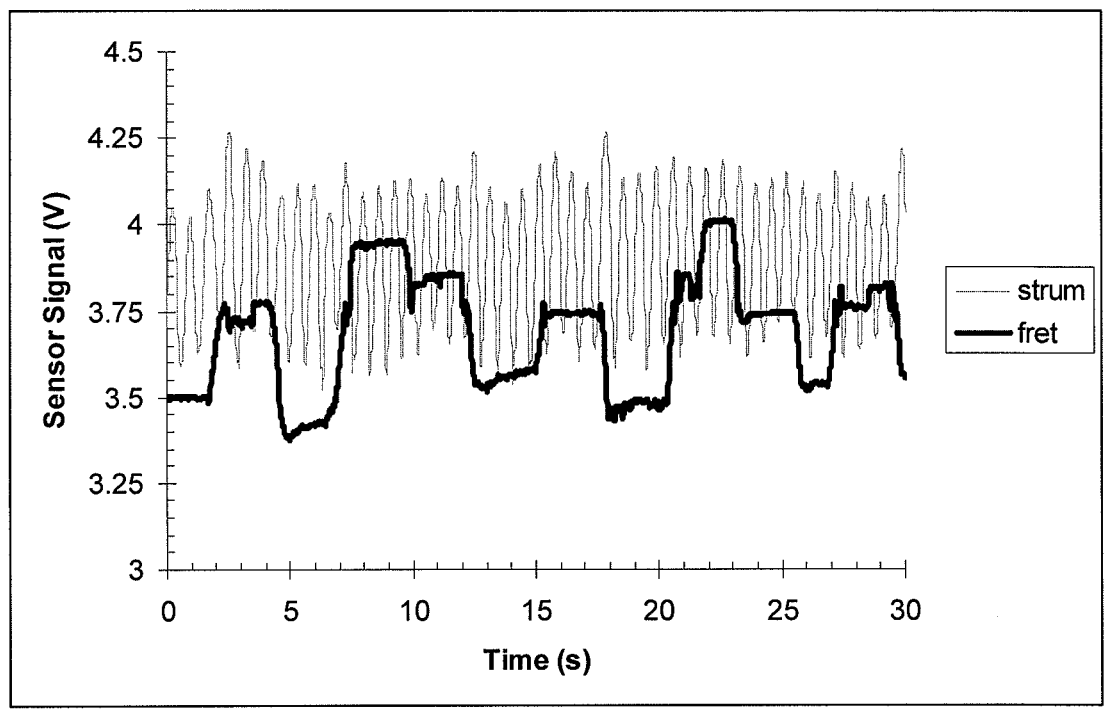
FIG. 7 is a graph showing signals based on the angular orientation of the elbows of the musician that are received by the computer when the system shown in FIG. 1 is configured as a guitar.

Typical signals from the fret and strumming arm sensors are provided in FIG. 7. The voltage signal from the strumming arm sensor is shown as a thin line and is substantially sinusoidal and represents a strumming arm motion of about 120 beats per minute. The bold line represents the signal from the fret arm sensor and is typical of the step wise motion of the hand moving along the fret arm of an actual guitar.

Figure 8:
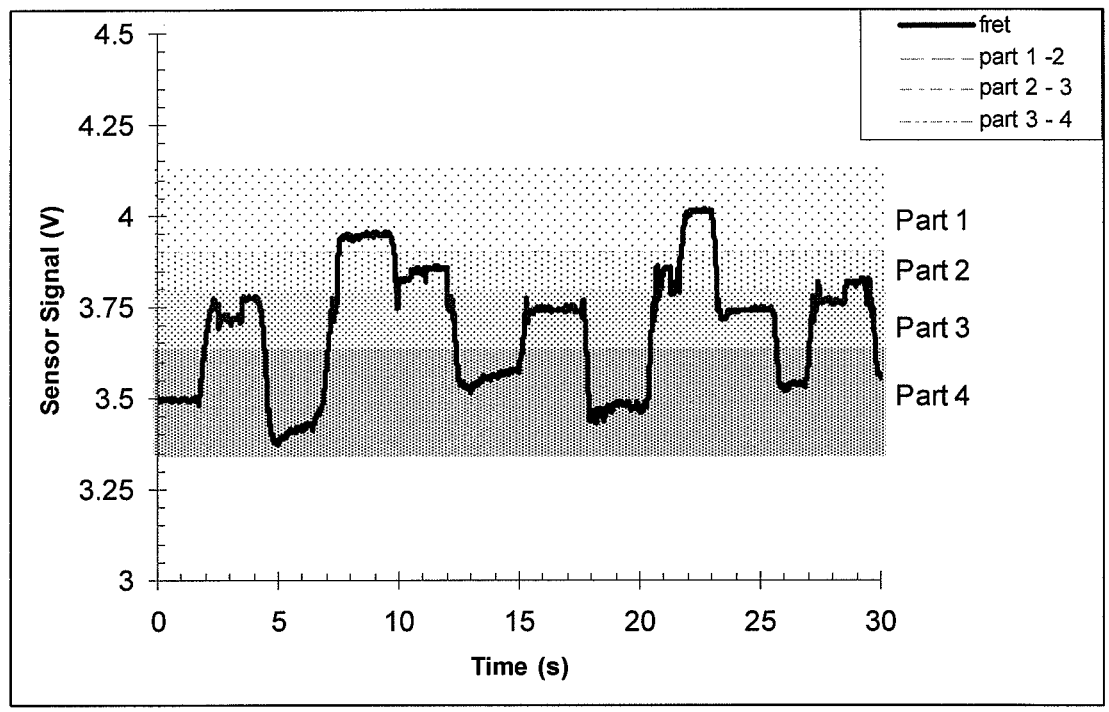
FIG. 8 is a graph showing the signal of the fret arm shown in FIG. 5, wherein the graph identifies four operating positions or zones.

FIG. 8 illustrates the signal of the fret arm sensor shown in FIG. 7. In addition, FIG. 8 has four voltage ranges that equate to the ranges of angular orientation and, therefore, ranges of signals of the fret elbow sensor. By following the calibration process described above in relation to FIGS. 3 to 5, operating positions of the angular orientation of the fret elbow sensor are calibrated as follows:

| Voltage range for fret arm sensor based on angular orientation | Operating position/Part | Sample sound allocated |
|---|---|---|
| 3.90 to 4.15 | 1 | Chuck down |
| 3.80 to 3.90 | 2 | E maj |
| 3.65 to 3.80 | 3 | A maj |
| 3.35 to 3.65 | 4 | D maj |

Figure 9:
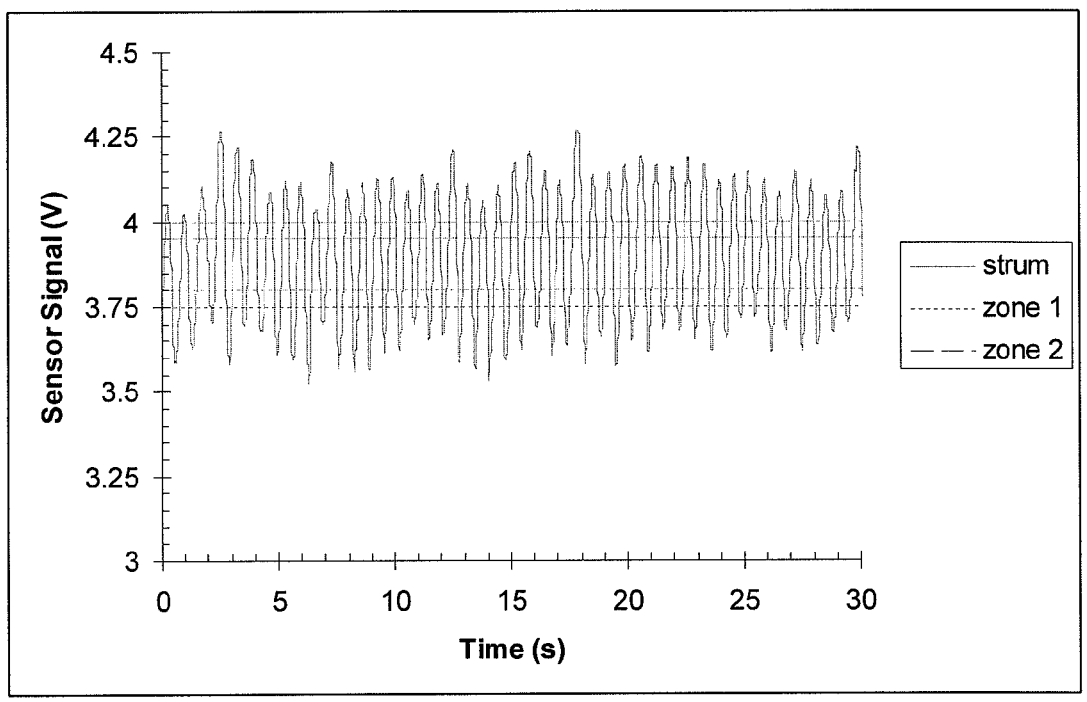
FIG. 9 is a graph showing the signal of the strum arm shown in FIG. 5, wherein the graph identifies two operating positions or zones.

FIG. 9 illustrates the signal from the strumming arm sensor shown in FIG. 7. In particular, the signal is a solid line having a sinusoidal wave form. We have found that a realistic guitar strumming sound is produced by defining two discrete operating positions or zones within the typical arm motion. FIG. 7 indicates the location of two operating zones, each being defined by a range of angular orientations and, therefore, a range of signals of the strumming arm sensor. Zone 1 ranges from the 3.75 to 3.80 volts and zone 2 ranges from 3.95 to 4.00 volts. The algorithms carried out by computer analysis enable the rate of change of the signal within each zone to be determined. In the situation where the computer determines that the operating zone 1 is played in the upward direction, i.e. an up strum and the fret arm is orientated such that when the signal from the fret arm sensor falls within the boundaries set for fret box 3, the output played is that allocated in FIG. 5, i.e. A major as an up strum. In the situation where the computer determines that the operating zone is played in the downward direction, i.e. a down strum and the fret arm is orientated such that when the signal from the fret arm sensor falls within the boundaries set for fret box 3, the output played is that allocated in FIG. 5, i.e. A major as a down strum. Similarly, fret operating positions 2 and 4 i.e will be played as E major and D major as up strums when the strum arm sensor detects an up strum or as down strums when the strum sensor detects a down strum. Although the drop boxes for each fret position shown in FIG. 5 show outputs as either "up" or "down" which implies that the output is an up strumming sound or and down strumming sound, in the situation where a separate strumming sensor is used, two outputs are allocated to each fret position, namely the chord play as an up strum or a down strum. The differentiation between "up" and "down" chords as shown in the drop box of Fret 4 in FIG. 5 is only applicable if a strumming sensor was not in use and, therefore, the number of output for each fret position is limit to one. However, when a strumming sensor is used in conjunction with the fret sensor, two outputs, namely sounds representing up and down strumming of each chord can be assigned to each fret position.

Figure 10:
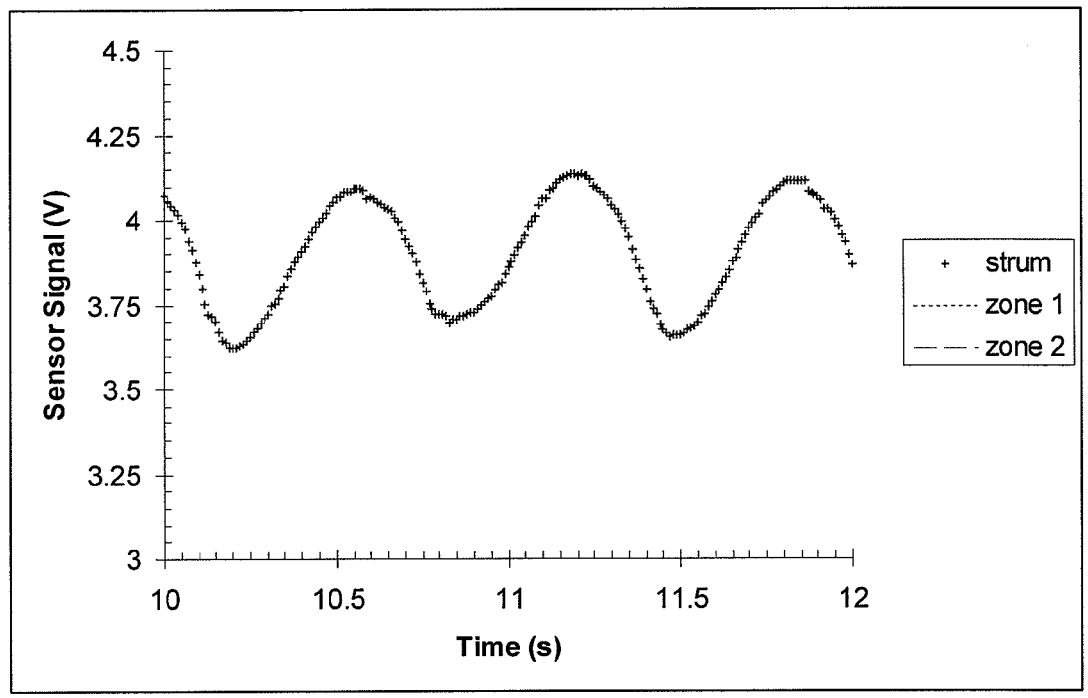
FIG. 10 is a graph showing the signal for a period of 2 seconds, i.e. from 10 to 12 seconds shown in FIG. 9, wherein the value of the signal is taken every 10 milliseconds.

The algorithms used to determine whether the signal falls within the Fret boxes 1 to 6 or the strumming zones 1 or 2 may be carried out using any suitable computer language that enables analysis of analogue and/or digital data. We have found that this sort of analysis is more easily carried out on digital data. FIG. 10 is a graph showing the strumming signal in FIG. 9 for a period from 10 to 12 seconds that has been digitised by sampling the signal from the strumming arm sensor every 10 milliseconds (100 Hz). Each sampling event is indicated by a "+" symbol. The algorithms analyse the rate of the change of the voltage within each strumming zone by calculating the spaces between the "+" symbols and thereby determines whether an up strumming is occurring or whether down strumming is occurring. In addition, the rate of change of the voltage is calculated and is the basis on which the volume of the output is played. We have found that the frequency at which the signal is sampled is important to give the musician responsive audio feedback. Generally speaking, a signal sampling rate in the order of 1 to 50 milliseconds provide the musician with an ability to control volume and expression of the sound in a realistic manner that simulates the sound of an actual guitar.

Figure 11:
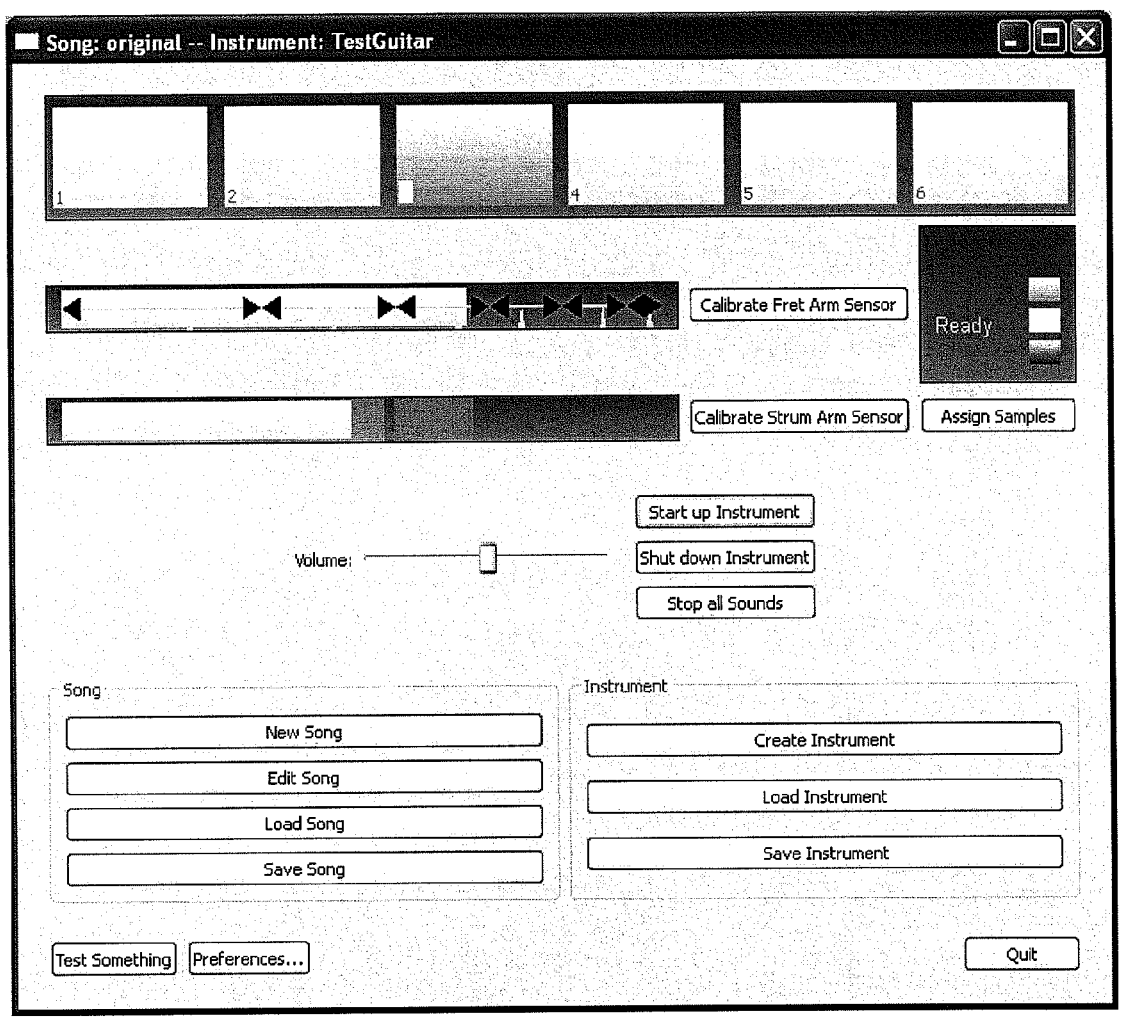
FIG. 11 is a screen shot of the computer monitor similar to that shown in FIG. 3 with the screen shot providing visual feedback on the status of the system to the musician.

FIG. 11 is a screen shot of the computer monitor that is viewed by a musician during a performance and after the calibration of the system. Although not shown in FIGS. 3 and 11, it is envisaged that the screens be colour so as to aid in the visability of the information displayed. In the case of FIG. 11, fret box 3 is shaded relative to the other fret boxes indicating that the orientation of the fret arm is such that the signal from the fret sensor falls within fret box 3. Similarly, light coloured bars continuously extend and retract from the left to right along the fret arm lines and the strumming arm box which provide visual feedback on the operating position of the fret and strumming arm sensor at any particular stage.

We have found that it is important to minimise the period between the system's output and a change in the orientation of the musician elbow, ie. "motion to sound". Ideally the system latency for "motion to sound" is less than 50 milliseconds and preferably less than 10 milliseconds to give a good dynamic performance. A latency of 35 milliseconds is generally acceptable.

The latency period is an accumulation of:
- the time taken for the signal of the sensor be conveyed from the transmitter; which according to the preferred embodiment is no more that 1 or 2 milliseconds;
- the time taken for the transmitter to transmit the signal to a receiver thereafter to through a USB port of the computer;
- the time taken of the central processing unit of the computer carry out the algorisms to the status of the signals; and
- the time taken to send an signal to the speakers to emit sound.

One of the benefits of the present invention over other systems presently available is that depending on the particular outputs allocated to the operating positions, the boundaries of angular orientation of each operating position can be adjusted so that angular orientations resemble or co-inside with the angular orientations for the same output of a actual instrument.

Those skilled in the art of the present invention will appreciate that many variations and modifications may be made to the preferred embodiment without departing from the spirit and scope of the present invention.

For example, rather than the sensor being in the form of variable electrical sensors as described above, it is possible that the sensors may be in the form of optical fibres and that the amount of light conducted by the fibres and, ultimately, the signal received the computer is a function of the bending of the fibres which resembles body movement.

As a further example, the output from any bodily motion may be processed in additional conditioning units to create additional effects, such as reverb, distortion and delay, as is customary with existing instrument recording and/or effect units and the like.

The claims defining the invention are as follows:
1. A system that is operated by a user to produce outputs, the system including:
   a garment that is worn by the user having at least two sensors attached to the garment for sensing the biomechanical position of two different joints of the user's body, each sensor being operated over two or more operating positions that each represent a different biomechanical position of the user, wherein the sensors are removably attached to the garment, thereby allowing the garment to be refreshed by washing or placed entirely as desired;

an electronic device that receives output signals from the sensors and has a display that displays i) graphically representations of the operating positions, ii) assignable outputs of the system, and the electronic device also producing the outputs of the system;

a transmitter that receives output signals from the sensors and wirelessly transmits the output signals to the electronic device;

an input device that can be operated to calibrate the system by assigning each graphical representation of each operating position to at least one of the outputs of the system, and assigning ranges of the output signals of each sensor to each of the graphical representations of the operating positions, and wherein the input device comprises a plurality of selectable buttons corresponding to the graphical representations of each operating position of the sensors, and operating the buttons allows the user to assign ranges of the output signals of each sensor to the graphical representations of the operating positions of the sensors, and allows the outputs of the system to be assigned to the graphical representations of the operating positions of at least one of the sensors from a range of possible outputs of the system displayed on the display;

a feedback means that communicates to the user the operating positions of the sensors by indicating on a display the graphical representation of the operating position for the output signal being received by the electronic at any one time, and the feedback means also communicates to the user information identifying which particular output of the system that has been assigned to each graphical representation of the operating positions; and wherein a set of outputs can be reproduced by the user by repeating biomechanical movements of the joints for which the garment has sensors.

2. The system according to claim 1, wherein the sensors include first and second sensors, and the input device can be operated to assign each graphical representation of the operating positions of the first sensor to at least two outputs of the system, and the input device can be operated to associate the graphical representation of the operating positions of the second sensor to each of the two outputs of the graphical operating positions of the first sensor, such that the output of the system is determined by the operating positions of the first and second sensors.

3. The system according to claim 1, wherein the outputs of the system are in the form of either one or a combination of visual outputs and audible outputs.

4. The system according to claim 3, wherein the audible outputs are a pre-recorded sound or a stored sample of sound.

5. The system according to claim 3, wherein the audible outputs are produced or played with accompanying outputs that are unrelated to the operating position of the sensors.

6. The system according to claim 1, wherein the sensors includes an electrical resistor that provides variable electrical resistance depending on the various operating positions of the sensors and thereby provide the output signals of the resistors.

7. The system according to claim 1, wherein the operating positions of the sensors are defined by a range of angular orientations of one or more body joint of the user such as but by no means limited to finger, wrist, elbow, shoulder, neck, back, hip, knee or ankle joints.

8. The system according to claim 1, wherein the range of output signals that are assigned to graphical representations of the operating positions are adjustable by operating the input device or are adjustable so as to recalibrate the system to suit different individual users.

9. The system according to claim 1, wherein the system is calibrated for each individual operator and the stored configuration can be recalled or re-activated after use of the system by other operators.

10. The system according to claim 1, wherein the display includes a picture or schematic illustration of a musical instrument or a part thereof, and each operating position represents or simulates biomechanical positions of the operator playing the instrument which is shown on the display.

11. The system according to claim 1, wherein the delay between the sensors being located in an operative position and the electronic device producing or playing the desired output is equal to or less than 50 milliseconds.

12. The system according to claim 11, wherein the delay period is less than or equal to 10 milliseconds.

13. The system according to claim 1, wherein the electronic device has a memory that stores data on any one or a combination of:

the operating positions, including ranges of values of the output signals of the sensors that define operating positions;

the outputs of the system, including audible outputs; and the assignment or allocation of particular outputs to selected operating positions.

14. The system according to claim 1, wherein the electronic device has a data process unit that processes data on any one or a combination of the following:

carrying out algorithms analyzing the signal from the sensor;

carrying out algorithms that assess whether the signals equals or falls within the ranges of the values of the signals that defines calibrated operation positions; and carrying out algorithms that calculate the speed at which the value of a signal of a sensor changes, and thereby determines the volume at which an audible output should be played based on the rate of change of the signal.

15. The system according to claim 1, wherein the first and second sensors sense displaying the angular orientation of the elbows of the user.

16. The system according to claim 15, wherein the system is calibrated such that the operating positions have an angular orientation ranging from approximately 5 to 45 degrees.

17. The system according to claim 16, wherein the sensor and/or electrical device are calibrated such that the operating positions are defined over angular orientations ranging from 5 to 20 degrees.

18. The system according to claim 15, wherein the first sensor represents a fret sensor which displays the angular orientation of one of the operator's elbows and is divided into at least six ranges, each being assigned one of the graphical representations of the operating position and each simulating biomechanical positions of an operator's elbow with respect to the fret board of a guitar.

19. The system according to claim 18, wherein the six operating positions of the fret sensor are associated with a pair of outputs, each pair representing a chord of a guitar that produces the sound of the chord played by an up-strum or a down-strum of a guitar.

20. The system according to claim 15, wherein the second sensor represents a strumming sensor and, displays the angular orientation of the other elbow such that the output signals from the strumming sensor are assigned to at least two different graphical representations of the operating positions.

21. The system according to claim 20, wherein a first graphical representation of a first operating position represents when the elbow is oriented in a curled position and a second graphical representation of a second operating position represents when the elbow is oriented in an extended position, and the two operating positions are separated by a further range of angular orientations of the elbow that is not assigned an output of the system.

22. The system according to claim 21, wherein when the electronic device receives the output signal from the strumming sensor indicating that the elbow has moved from the first graphical representation of the operation position to the second graphical representation of the operating position, i.e. the elbow at the strumming sensor has moved from a curled position to an extended position, the electronic device produces or plays an output that corresponds to down strumming a particular chord determined by the signal from the fret sensor, and when the electronic device receives a signal indicating that the strumming sensor has moved from an extended position to the curled position, the electronic device produces or plays a sound
that corresponds to an upward strumming of the guitar of a particular chord that is determined by the signal of the fret sensor.

23. The system according to claim 20, wherein the electronic device includes an algorithm that calculates the rate of change of the output signal of the strumming sensor which determines, at least in part, the volume at which outputs of the system are played.

24. A method of operating a system including: a garment that is worn by a user having at least two sensors removably attached to the garment for sensing the biomechanical position of two different joints of a user's body, each sensor being operated over two or more operating positions that each represent a different biomechanical position of the user; an electronic device that has a display and comprises a plurality of selectable buttons corresponding to the graphical representations of each operating position of the sensors, the electronic device also producing the outputs of the system; and an input device that can be operated to calibrate the system, the method including the steps of:
 a) transmitting output signals wirelessly from the sensors to the electronic device, wherein the sensors are adapted to transmit signals based on biomechanical movement and positions of the operator;
 b) displaying on the display i) graphical representations of two or more operating positions and ii) the outputs of the system that can be assigned to the graphical representations,
 c) assigning each graphical representation of the operating positions to at least one of the outputs of the system, wherein step b) includes operating buttons of the input device so as to assign outputs from the range of assignable outputs of the system to the graphical representations of the operating positions of at least on the sensors;
 d) assigning ranges of the output signals of each sensor to each of the graphical representations of the operating positions, wherein step c) includes operating buttons of the input device so as to assign ranges of the output signals of each sensor to the graphical representations of the operating positions of the sensors;
 e) communicating to the user the operating positions of the sensors by indicating on the display the graphical representation of the operating position for the output signal being received by the electronic device at any one point of time;
 f) communicating to the user information identifying which particular output of the system that has been assigned to each graphical representation of the operating positions,
 g) reproducing a set of outputs by the user repeating biomechanical movements of the joints for which the garment has sensors, and
 h) removing the sensors from the garment, thereby allowing the garment to be refreshed by washing or placed entirely as desired.

25. The method according to claim 24, wherein the sensors of the system include first and second sensors, and the input device comprises a plurality of selectable buttons for each sensor, wherein the method includes assigning each graphical representation of the operating positions of the first sensor to at least two outputs of the system, and associating the graphical representation of the operating positions of the second sensor to each of the two outputs of the graphical operating positions of the first sensor, and determining the output of the system based on the operating positions of the first and second sensors.

26. The method according to claim 24, wherein the outputs are audible outputs including notes, chords, riffs, bars of music, or any section of actual music.

27. The method according to claim 24, wherein the method includes moving the sensors between known operating positions that have been graphically represented and to which known outputs have been assigned so as produce a known sequence of outputs.

28. The method according to claim 24, wherein step d) involves defining particular operating positions over a range of selectable biomechanical positions and thus to a range of values of the signals of the sensors received by the electronic device.

29. The method according to claim 28, wherein the biomechanical movement or position is a function of the angular orientation of one or more body joints such as finger, wrist, elbow, shoulder, neck, back, hips, knees or ankles.

30. The method according to claim 29, wherein step c) involves assigning outputs to the graphical representations of the operating positions based on operating positions resembling the angular orientation or gestures that would be required when operating an actual instrument.

31. The method according to claim 24, wherein the information is presented or communicated to the operator by visual and/or audio sources.

32. The method according to claim 31, wherein the visual source displays to the user all of the possible operating positions of the sensors and, at any point in time, the operating positions in which each sensor is located.

33. The method according to claim 32, wherein the visual source is a display that displays to the user a picture or schematic illustration of an instrument, or a part thereof, and each graphical representation of the operating position simulates the biomechanical position that the user would assume when playing the instrument depicted in the display to produce the output assigned to the graphical representation of the operating position.

34. The method according to claim 31, wherein the visual source displays information identifying the type of output assigned to each graphical representation of the operating position.

35. The method according to claim 24, wherein the method further includes step h) that involves storing data on the signals or the range of values of the output signals that have been assigned to the graphical representation of the operating positions for each user.

36. The method according to claim 35, wherein step h) stores data profiles relating to either one or a combination of operating positions and outputs assigned to each operating position with reference to individual operators, and the electronic device can be switched between different stored profiles to facilitate use by more than one operator without requiring recalibration.

37. The method according to claim 24, wherein the method includes analyzing the signals from the sensors using an algorithm that calculates whether the output signals equal or falls within the ranges of the values of the signals that have been selected as defining or calibrated with the operating positions in accordance with step d).

38. The method according to claim 24, wherein the method includes analyzing the output signals from the sensors using an algorithm that calculates the rate of change of the value of the output signals of the sensors, and in turn, determines the volume at which an audible output of the system is played.

39. The method according to claim 24, wherein the method includes playing a partially complete piece of music at the same time as carrying out steps a) and b) to accompany the music being played.

40. The method according to claim 24, wherein the system includes two sensors for displaying the angular orientation of the elbows of the operator.

41. The method according to claim 40, wherein step d) involves assigning the output signals of the sensors in which the elbows of the operator have an angular orientation ranging over from approximately 5 to 45 degrees.

42. The method according to claim 25, wherein the first sensor is a fret sensor which, displays the angular orientation of one of the operator's elbows and is divided into at least six ranges, each being assigned one of the graphical representations of the operating position and each simulating biomechanical positions of an operator's elbow with respect to the fret board of a guitar.

43. The method according to claim 42, wherein the six operating positions of the fret sensor are associated with a pair of outputs, each pair representing a chord of a guitar that produces the sound of the chord played by an up-strum or a down-strum of a guitar.

44. The method according to claim 42, wherein the second sensor represents a strumming sensor and displays the angular orientation of the other elbow such that the output signals from the strumming sensor are assigned to at least two different graphical representations of the operating positions.

45. The method according to claim 44, wherein a first graphical representation of a first operating position represents when the elbow is oriented in a curled position and a second graphical representation of a second operating position represents when the elbow is oriented in an extended position and the two operating positions are separated by a further range of angular orientations that is not assigned an output.

46. The method according to claim 45, wherein when the electronic device receives the output signal from the strumming sensor indicating that the elbow has moved from the first graphical representation of the first operating position to the second graphical representation of the operating position, i.e. the elbow at the strumming sensor has moved from the curled position to an extended position, the electronic device produces or plays an output that corresponds to down strumming a particular chord determined by the signal from the fret sensor, and when the electronic device receives a signal indicating that the strumming sensor has moved from an extended position to the curled position, the electronic device produces or plays a sound that corresponds to an upward strumming of the guitar of a particular chord that is determined by the signal of the fret sensor.

* * * * *